July 24, 1934.     E. A. ZADIG     1,967,730
CLUTCH CONTROL DEVICE
Filed Sept. 8, 1930
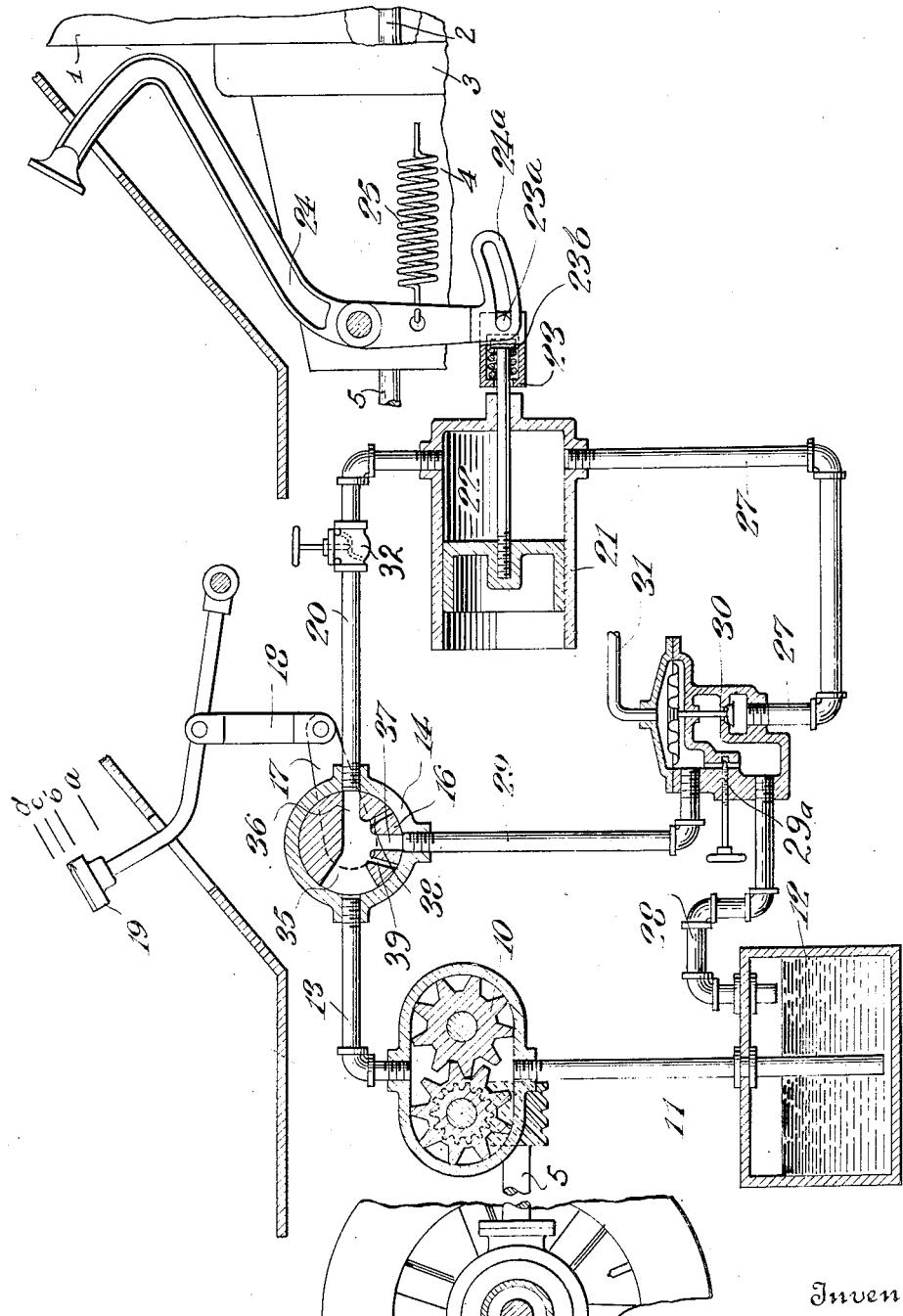
Inventor
Ernest A. Zadig
By his Attorneys
Emery, Booth, Varney & Whittemore Patented July 24, 1934

1,967,730

UNITED STATES PATENT OFFICE

1,967,730

CLUTCH CONTROL DEVICE

Ernest A. Zadig, New York, N. Y.

Application September 8, 1930, Serial No. 480,413

13 Claims. (Cl. 192—.01)

This invention relates to automotive vehicles, particularly to the power transmission mechanism of such vehicles and has for an object the provision of means for controlling the driving connection between the motor and the traction wheels in accordance with predetermined conditions of operation.

Some automobiles are now being equipped with devices which control the driving connection to the traction wheels by mechanism similar to the well-known coaster brakes used on bicycles. They comprise an over-running clutch which ceases to function as a connection when the road wheel shaft has a higher speed than the engine drive shaft at the driving range for which the transmission gears are engaged. This leaves the wheels free to turn without driving the engine, which were it not for the disengagement would act as a brake. However, it is sometimes desired that the engine shall be used as a brake and for this condition means are provided for reestablishing the driving connection, usually by eliminating the over-running action of the clutch.

Such known devices as are used for this purpose are built as an integral part of the transmission units of automobiles and are not available for use on cars already in service. Further, the devices complicate the transmission mechanism to a considerable extent, a condition which it is desirable to avoid. The present invention provides a device which will serve all the required purposes and which may be readily installed on automobiles already in service. Moreover, the device does not involve any changes to the standard transmission of automobiles. It is simple, efficient and inexpensive.

One form of the invention will be described to illustrate the principles of the invention, reference being made to the accompanying drawing wherein the single figure is a schematic view of mechanism embodying the invention.

Briefly the apparatus in its illustrative form comprises a clutch control unit which may be applied to any automotive vehicle either as original equipment or as an accessory later. It makes the operation of the clutch a function of the ground wheel speed which leaves the car in condition to be started and stopped manually just as if the automatic clutch control device were not present; it makes the operation of the clutch a function of the speed of the motor as well as of the wheels, thus insuring that the motor and wheels will have substantially the proper relative speeds when the clutch is engaged; it makes the operation of the clutch a function of the throttle condition, thus timing the operation of the clutch in accordance with the natural conditions of operation of the car; and it provides that the motor may be used when desired to assist in braking the car when the foot is taken completely off the accelerator pedal in order to apply the foot brakes but not without first securing synchronization of the motor and wheel speeds. The foot accelerator is selected as the throttle control member employed since it has a certain range of movement for active control of the motor and usually also a certain range of movement—a slack or idle movement—wherein no control is effected thereby. Herein this idle travel as well as the active travel of the accelerator is utilized and if the accelerator does not have an idle travel or an idle travel of the desired amount it can readily be altered or adjusted to provide it.

Referring to the drawing, some of the conventional parts of an automotive vehicle with which this invention is adapted to be used are shown diagramatically, as for example, motor 1 having motor shaft 2, clutch 3, transmission 4 and propeller shaft 5. A fluid pump 10 of a type adapted to create pressure in accordance with its speed is mounted where it may be driven in accordance with the speed or be driven by the traction wheels of the vehicle. For example, it may be driven by the propeller shaft extending from the rear of the transmission to the differential. The pump is not entirely positive in its action but may have slip through the fluid if the flow of fluid from the pump is obstructed.

The pump receives fluid, preferably oil or some mixture which does not appreciably change its condition with use or change of temperature, by way of a conduit 11 from a storage reservoir 12. A conduit 13 leads fluid from the pump to a control valve body 14. Within the valve body is rotatably mounted a valve plug 16 provided with an operating arm 17.

The valve arm 17 is actuated through suitable linkage 18 by the foot accelerator pedal 19. The pedal has a driving or accelerating range of movement $a$—$b$ and a coasting range of movement $b$—$c$. It may also be provided that the point $c$ is merely the position assumed by the pedal when the foot pressure on the same is released and that the pedal will rise to some point $d$ when the weight of the foot is entirely removed, giving a braking range $c$—$d$.

A conduit 20 connects the valve body 14 with a cylinder 21 within which operates a clutch control piston 22, having a piston rod 23 attached to the main clutch pedal 24 of the car. The clutch pedal has a spring 25 tending to move it to engage the main clutch. From this it will be seen that when pressure is built up in the cylinder behind the piston the main clutch will be disengaged just as if the driver had pushed the clutch pedal with his foot, and that when the pressure in the cylinder is relieved the spring 25 will re-engage the main clutch.

The clutch pedal 24 is provided with a slotted portion 24a cooperating with the pin 23a of the piston rod permitting the clutch pedal to be pushed down in the usual way to disengage the clutch. A spring 23b in the rod 23 absorbs sudden jerks in operation.

An outlet conduit 27 leads from the cylinder to a diaphragm control valve 30 and from this a return conduit 28 leads to the reservoir. A conduit 29 is connected to the valve body 14 and to the valve 30 to supply fluid to one side of the diaphragm. A needle valve 29a provides regulable flow from the lower side of the diaphragm and conduit 29 to the reservoir.

The motor should have time to pick up speed comparable to that of the road wheels before it is connected to the wheels. The valve 30 employed for causing pressure to build in the cylinder also serves this last-mentioned purpose.

In the illustrative embodiment of the invention the diaphragm valve 30 is controlled mutually by pressure in the conduit 29 produced by the pump 10 in accordance with road wheel speed and pressure in a conduit 31 produced in accordance with the motor speed. The conduit 31 may for example be connected to the oil guage line of the motor. The flow of fluid in the conduit 27 flows against the head of the valve 30 and thus assists in operating the diaphram on the road wheel side against the pressure on motor side. A flow regulating throttle valve 32 may be placed in the conduit 20.

The valve plug 16 is provided with a flared port 35 always in registry with the conduit 13, and connected with this port a coasting cylinder port 36 adapted to be connected with the cylinder feed conduit 20, a coasting diaphram port 37 connecting with the conduit 29, an accelerating port 38 adapted to register with the diaphram conduit 29 and a braking port 39 also adapted to register with the conduit 29. The ports 38 and 39 may be smaller (say about one-third the size) than the port 37.

In driving, the accelerating port 38 registers with the diaphram conduit 29 when the accelerator pedal is in the driving range a—b feeding gas to the motor to drive the wheels. In this position the clutch is engaged and the motor shaft turns at a speed corresponding to the speed of the propeller shaft.

The operation of the device is as follows. Suppose the car is at rest with the motor running and the clutch disengaged (by the foot). The accelerator pedal is all the way up in the range c—d. Port 36 is closed. Small port 39 is open to valve 30 but the pump is not operating so motor generated pressure holds valve 30 open. The clutch is unaffected.

Suppose now the clutch is let in and the car started. The accelerator must be moved to the driving range a—b opening small port 38 to the wheel side of the valve 30. No fluid is let into the cylinder 21 so the wheel pressure is less than the motor pressure on the diaphram of valve 30 (since the motor and wheels are clutched together and the motor runs relatively faster than the wheels in low gear). The valve 30 remains open and the clutch is still unaffected.

Through intermediate and into high gear the condition remains the same. In high gear the wheel pressure on the diaphram equals the motor pressure but the valve 30 still remains open.

Now suppose the accelerator pedal is let up from the acceleratng or active range into the coasting or idle range b—c—but not completely released. Fluid flows through port 36 and conduit 20 into the cylinder 21 but at first can produce no effect for valve 30 is still open. Fluid also flows from large port 37 to the wheel side of the diaphram. The increase in pressure on the diaphram coupled with the flow pressure on the head of the valve 30 closes it against the motor pressure on the diaphram. The pressure in cylinder 21 builds up to disengage the clutch. The motor begins to run relatively more slowly. This reduces the pressure on the motor side of the diaphram and the valve 30 is closed tighter. Relief on the pump is maintained by its own slip through the fluid and the flow through needle valve 29a.

If now the accelerator pedal is pushed down to the driving range a—b the port 36 to the clutch cylinder closes and the small port 38 opens to the diaphram. Valve 30 being closed, fluid is trapped in the cylinder. Since it will not readily leak out the clutch is kept out. As the motor comes up to a speed approximately that of the wheels the pressure on the motor side of the diaphram increases sufficiently to open valve 30. This permits fluid to flow from the cylinder and the clutch to be re-engaged. Valve 30 remains open even though wheel and engine pressures are equal for there is no flow pressure on the head of the valve.

If the accelerator pedal is completely released so as to move quickly from the accelerating range a—b to the braking range c—d without pausing in the coasting range b—c the clutch is left engaged. There may be a jerk on the piston 22 but the spring 23b absorbs this without moving the clutch. This is important because in city traffic the pedal may never be brought to a pause in coasting position and the car will therefore be kept under close control at all times.

If the pedal moves from coasting to braking range the clutch, being disengaged, will not be re-engaged for fluid will be trapped in the cylinder. Since the motor speed is considerably below wheel speed pressure the valve 30 will not be opened and the pressure of the trapped fluid will be maintained. It is important to avoid sudden strain and breakage that the motor and wheels be not re-engaged when thus having a wide disparity in speed.

However, if the wheel speed decreases to something slightly below motor speed the valve 30 will open to drain the fluid from the cylinder and allow the clutch to be re-engaged. This is important for it is desirable always to have the motor and wheels clutched together at low wheel speed. Otherwise, when the accelerator was moved to driving range the motor would be speeded up and then stalled by the sudden engagement of the clutch. This also leaves the clutch entirely free for foot control at low speeds or for starting from a complete stop.

Obviously if it is desired to synchronize the motor and wheels for the braking stage the accelerator pedal may be moved momentarily into the accelerating range until the clutch is engaged and then released quickly to allow it to move to the braking range, leaving the clutch engaged.

While one embodiment of the invention has been described by way of example it is to be understood that various changes may be made within the scope of the subjoined claims.

What I claim is:—

1. Apparatus of the character described comprising in combination, a clutch and a clutch pedal, a fluid pump operated by the propeller shaft of an automobile, a reservoir for supplying fluid to said pump, a clutch control cylinder, a piston therein operatively connected to the clutch pedal of the automobile, inlet and outlet conduits for said cylinder, the outlet conduit leading to said reservoir, a balancing diaphram valve in the outlet conduit from said cylinder, a control valve connected to said cylinder inlet conduit, said valve also being connected by a supply conduit to said pump and by a conduit to one side of the diaphram of said balancing valve, and linkage operatively connecting the plug of said valve to the accelerator pedal of the automobile, said valve plug being provided with a common inlet port connecting with said supply conduit, a driving range port for supplying fluid to said diaphram whereby the clutch is engaged when the accelerator pedal is in the driving range, the plug also being provided with a coasting port for supplying fluid to said cylinder and to said diaphram to disengage the clutch when the accelerator pedal is just above the driving range, and the plug further being provided with a braking port for supplying fluid to said diaphram whereby the clutch may be engaged when the accelerator pedal has been entirely relieved of the weight of the driver's foot.

2. Apparatus of the character described comprising in combination, a clutch and a clutch pedal, a fluid pump driven by a moving part of an automobile, means receiving fluid from said pump for operating the main clutch of the automobile, valve means for controlling the flow of fluid to said clutch operating means, said clutch operating means disengaging the said clutch when fluid is supplied thereto by the pump but allowing the clutch to be reengaged when the fluid is emptied therefrom, said valve means being actuated in accordance with the operation of the foot accelerator pedal, the clutch being disengaged when the pedal is moved to inactive position where it ceases to control the flow of gas to the motor but the clutch being reengaged to cause the motor to act as a brake when the foot of the driver is entirely removed from the accelerator pedal if the clutch connected parts have the proper relative speeds.

3. In automotive vehicles having a motor, driving clutch, motor accelerator device, and a motor shaft and a propeller shaft connected by the clutch, the combination of means responsive to the action of said accelerator device for controlling the engagement of said clutch, and means mutually responsive to the speeds of said motor and propeller shafts for effecting engagement of said clutch when said shafts have attained approximately the proper relative speeds.

4. In automotive vehicles having a motor, motor accelerator device, motor shaft, propeller shaft, and a clutch between the motor and propeller shafts, the combination of power means for engaging and disengaging said clutch, means for controlling said power means, and means for supervising the operation of said power means, said supervising means being controlled jointly in response to the motor and propeller shaft speeds for effecting engagement of said clutch when said shafts have attained approximately the proper relative speeds.

5. In automotive vehicles having a motor, motor accelerator device, motor shaft, propeller shaft, and a clutch between the motor and propeller shafts, the combination of power means for actuating said clutch, means for initiating the action of said power means for certain predetermined conditions of driving, and means for causing the engagement of said clutch when said motor and propeller shafts are substantially synchronized.

6. In automotive vehicles having a motor, motor shaft, propeller shaft, and clutch for the motor and propeller shafts, the combination of power means for actuating said clutch, and means for supervising the action of said power means to cause said clutch to be engaged when said motor and propeller shafts are substantially synchronized, said supervising means being jointly controlled by the speeds of the motor and propeller shafts.

7. Apparatus of the character described comprising in combination, a clutch, a clutch operating device, an accelerator device for the drive of the shaft with which said shaft is associated, a power device for engaging said clutch when said accelerator is in either of two extreme positions, and for disengaging the clutch when the accelerator device is held in an intermediate position, and means for absorbing the impulse created when said accelerator device passes quickly through the intermediate position without operating said clutch.

8. In automotive vehicles having a motor, a motor shaft, a propeller shaft, a clutch for said shafts, the combination of a power cylinder and piston for operating the clutch, a pump for supplying fluid under pressure to said cylinder, and a valve controlled mutually by pressure created in accordance with the speeds of said motor shaft and propeller shaft for controlling the pressure of fluid in said cylinder and thereby controlling the operation of said clutch.

9. In automotive vehicles, the combination with the vehicle motor, driving clutch and accelerator foot pedal, of means responsive to the action of said pedal for controlling the engagement of said clutch, said clutch controlling device disengaging the clutch when coasting but permitting it to be reengaged when accelerating or braking.

10. The combination with an automotive vehicle having a motor, a motor shaft, a propeller shaft and a clutch for said shafts, of means controlled in accordance with the speed of the propeller shaft for disengaging said clutch when the motor ceases to drive the propeller shaft at relatively high ground speeds, for reengaging the clutch when the motor begins to accelerate for driving the propeller shaft or when the ground speed drops below a predetermined minimum.

11. In automotive vehicles having a motor, driving clutch, motor accelerator device, and a motor shaft and a propeller shaft connected by the clutch, the combination of means responsive to the action of said accelerator device for controlling the engagement of said clutch, and means mutually responsive to the speeds of said motor shaft and propeller shaft for initiating engagement of said clutch when said shafts have attained approximately the proper speeds, said last named means causing progressively increasing rapidity of engagement of said clutch as proper relative speeds of the motor shaft and the propeller shaft are approached.

12. Apparatus as set forth in claim 11 which further includes in combination, adjustable means for determining the relative speeds at which engagement of the motor shaft and propeller shaft begins.

13. In automotive vehicles having a motor, motor shaft, propeller shaft, and a clutch for the motor and propeller shafts, the combination of power means for actuating said clutch, and means for supervising the action of said power means to cause said clutch to be progressively engaged as said motor and propeller shafts approach synchronization, said supervising means being jointly controlled by the speeds of the motor and propeller shafts.

ERNEST A. ZADIG.